Dec. 3, 1957 W. H. BERCH 2,815,405

ALARM SIGNALING SYSTEM FOR TELEPHONE EXCHANGES

Filed Jan. 20, 1955 11 Sheets-Sheet 1

INVENTOR.
WILLIAM H. BERCH
BY Henry H. Gage
AGENT

Dec. 3, 1957 W. H. BERCH 2,815,405

ALARM SIGNALING SYSTEM FOR TELEPHONE EXCHANGES

Filed Jan. 20, 1955 11 Sheets-Sheet 2

INVENTOR.
WILLIAM H. BERCH
BY Henry H. Gage
AGENT

INVENTOR.
WILLIAM H. BERCH
BY
Henry N. Gage
AGENT

INVENTOR.
WILLIAM H. BERCH
BY
[signature]
AGENT

INVENTOR.
WILLIAM H. BERCH
BY Henry H. Gage
AGENT

INVENTOR.
WILLIAM H. BERCH
BY Henry H. Gage
AGENT

Dec. 3, 1957 W. H. BERCH 2,815,405

ALARM SIGNALING SYSTEM FOR TELEPHONE EXCHANGES

Filed Jan. 20, 1955 11 Sheets-Sheet 7

INVENTOR.
WILLIAM H. BERCH
BY Henry H. Gage
AGENT

Dec. 3, 1957 W. H. BERCH 2,815,405

ALARM SIGNALING SYSTEM FOR TELEPHONE EXCHANGES

Filed Jan. 20, 1955 11 Sheets-Sheet 8

INVENTOR.
WILLIAM H. BERCH

BY [signature]

AGENT

ALARM SIGNALING SYSTEM FOR TELEPHONE EXCHANGES

Filed Jan. 20, 1955 11 Sheets-Sheet 9

INVENTOR.
WILLIAM H. BERCH
BY Henry H. Gage
AGENT

Dec. 3, 1957 W. H. BERCH 2,815,405

ALARM SIGNALING SYSTEM FOR TELEPHONE EXCHANGES

Filed Jan. 20, 1955 11 Sheets-Sheet 10

INVENTOR.
WILLIAM H. BERCH
BY
AGENT

Dec. 3, 1957 W. H. BERCH 2,815,405

ALARM SIGNALING SYSTEM FOR TELEPHONE EXCHANGES

Filed Jan. 20, 1955 11 Sheets-Sheet 11

INVENTOR.
WILLIAM H. BERCH
BY Henry H. Gage
AGENT 2,815,405

ALARM SIGNALING SYSTEM FOR TELEPHONE EXCHANGES

William H. Berch, Penfield, N. Y., assignor, by mesne assignments, to General Dynamics Corporation, a corporation of Delaware Application January 20, 1955, Serial No. 483,061
15 Claims. (Cl. 179—27)

The present invention relates to telephone systems, and more particularly to alarm signaling systems suitable for use in telephone systems.

In the past, it has been the practice to provide an alarm signaling system in which alarm apparatus in an unattended satellite telephone office is effective responsive to a fault condition arising in the satellite office to seize an outgoing trunk and thereby to extend a connection from the satellite office to an unattended tandem office; in such a system, seizure of the outgoing trunk is also effective to cause switching apparatus at the tandem office to further extend the connection through the tandem office to an operator position by way of another trunk, and to thereafter bring in a suitable alarm indicating signal at the operator position until the operator answers the signal. The chief shortcoming of such a system lies in the fact that failure of the tandem office switching equipment to interconnect the satellite office and operator position trunks or failure of the signaling equipment in either the tandem office or operator position results in a failure of the alarm sending system.

Therefore, it is an object of the present invention to provide a new and improved alarm signaling system.

Another object of my invention is to provide an alarm signaling system in which the satellite office trunk and tandem office switching apparatus are periodically released and reseized in the event that the operator answers an alarm signal and thereafter fails to dial an alarm checking number in the satellite office within a predetermined time interval.

In order to accomplish these and other objects, I provide in the preferred embodiment of my invention a telephone system comprising a first and a second unattended office interconnected by a first trunk, and an operator position interconnected to the second office by means including a second trunk. Responsive to a fault condition in either of the unattended offices, actuating means in the office in which the fault condition exists is operated for seizing a trunk termination in that office. Seizure of the trunk termination is effective for causing switching means to attempt to extend to the operator position an alarm indicating connection from the office in which the fault condition exists. First timing means in the latter office is energized responsive to the operation of the seizure controlling means for thereafter causing the seizure controlling means to periodically force the release of the alarm indicating connection and immediately thereafter cause the switching means to attempt to reestablish such a connection in the event that the alarm indicating connection then in progress is not completed within a first predetermined time interval by releasing and then reseizing the above referred-to termination.

In the event that an alarm indicating connection is completed to the operator position, operation of call answering and originating means at the operator position is effective for causing supervisory means at the operator position to transmit a signal over the alarm indicating connection to the previously seized termination. Supervisory means in the trunk termination is operative responsive to the receipt of such a transmitted supervisory signal for operating resetting means in the common apparatus of the office in which the fault condition exists; operation of the resetting means is effective for rendering the first timing means ineffective to thereafter prevent the forced release of the alarm indicating connection.

The supervisory means of the termination in which the fault condition exists is thereafter released responsive to the stopping of transmission of the supervisory signal when the operator disconnects from the alarm indicating connection. Means responsive to the release of the termination supervisory means and to the operation of the resetting means is effective for causing the seizure controlling means to release the alarm indicating connection to the operator position by releasing the termination.

Operation of the alarm resetting means is also effective for causing second timing means in the office in which the fault condition exists to periodically thereafter cause the seizure controlling means in the latter office to reseize and then release the previously referred-to termination after each of a series of second predetermined time intervals. Checking means operative responsive to the extension of a connection to alarm checking terminals in the office in which the fault condition exists causes the second timing means to be ineffective to thereby prevent a subsequent series of attempts to establish another alarm indicating connection from the office in which the fault condition exists to the operator position.

Further objects and advantages of my invention will become apparent as the following description proceeds, and the features of novelty which characterize the invention will be set forth and pointed out with particularity in the claims annexed to and forming a part of this specification. For a better understanding of my invention, reference may be had to the accompanying drawings in which:

Figure 1:
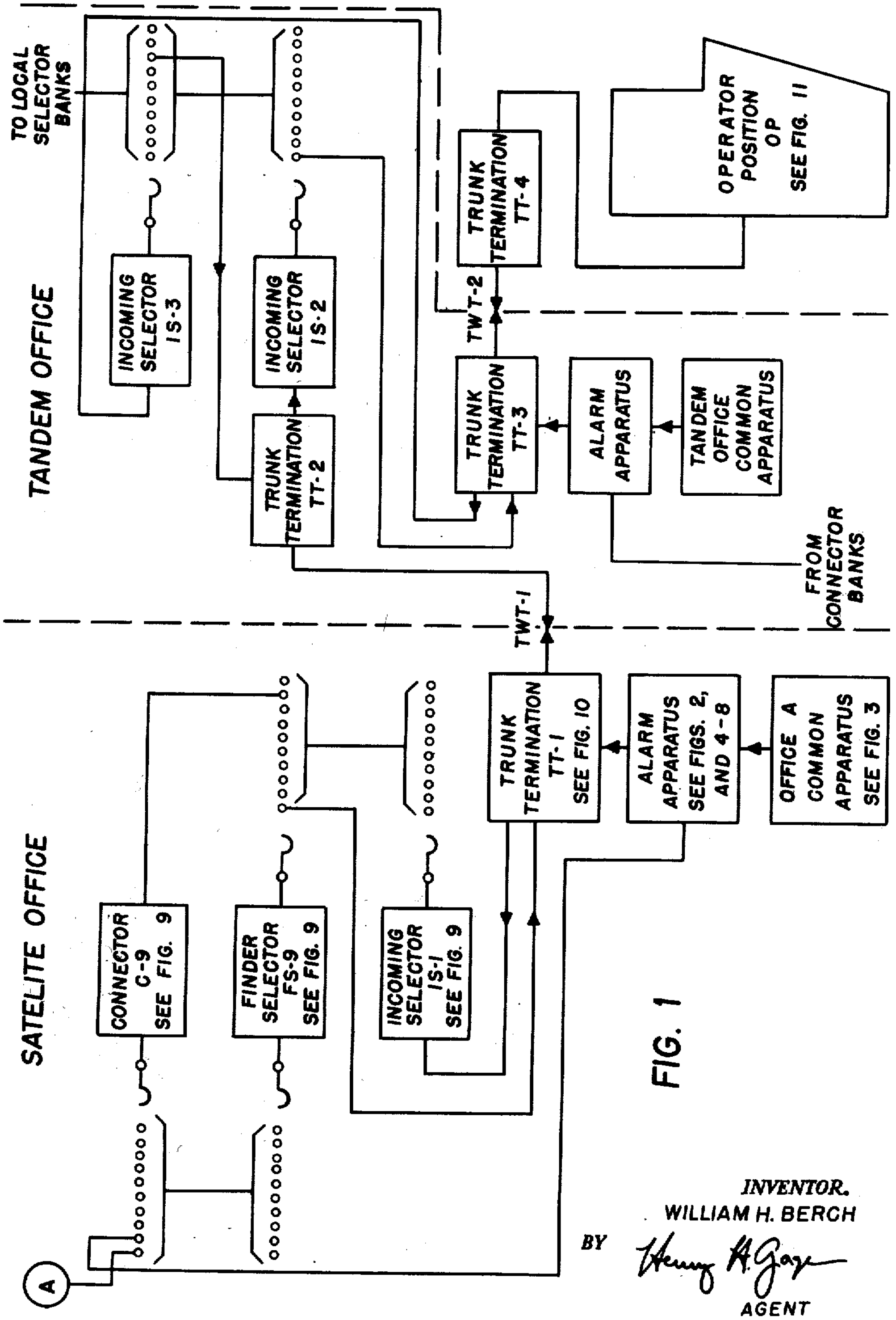
Fig. 1 shows the relationship between the satellite office, tandem office, and the operator position, as well as a skeletonized representation of the major components of the system as they are found in each of the offices.
Figure 2:
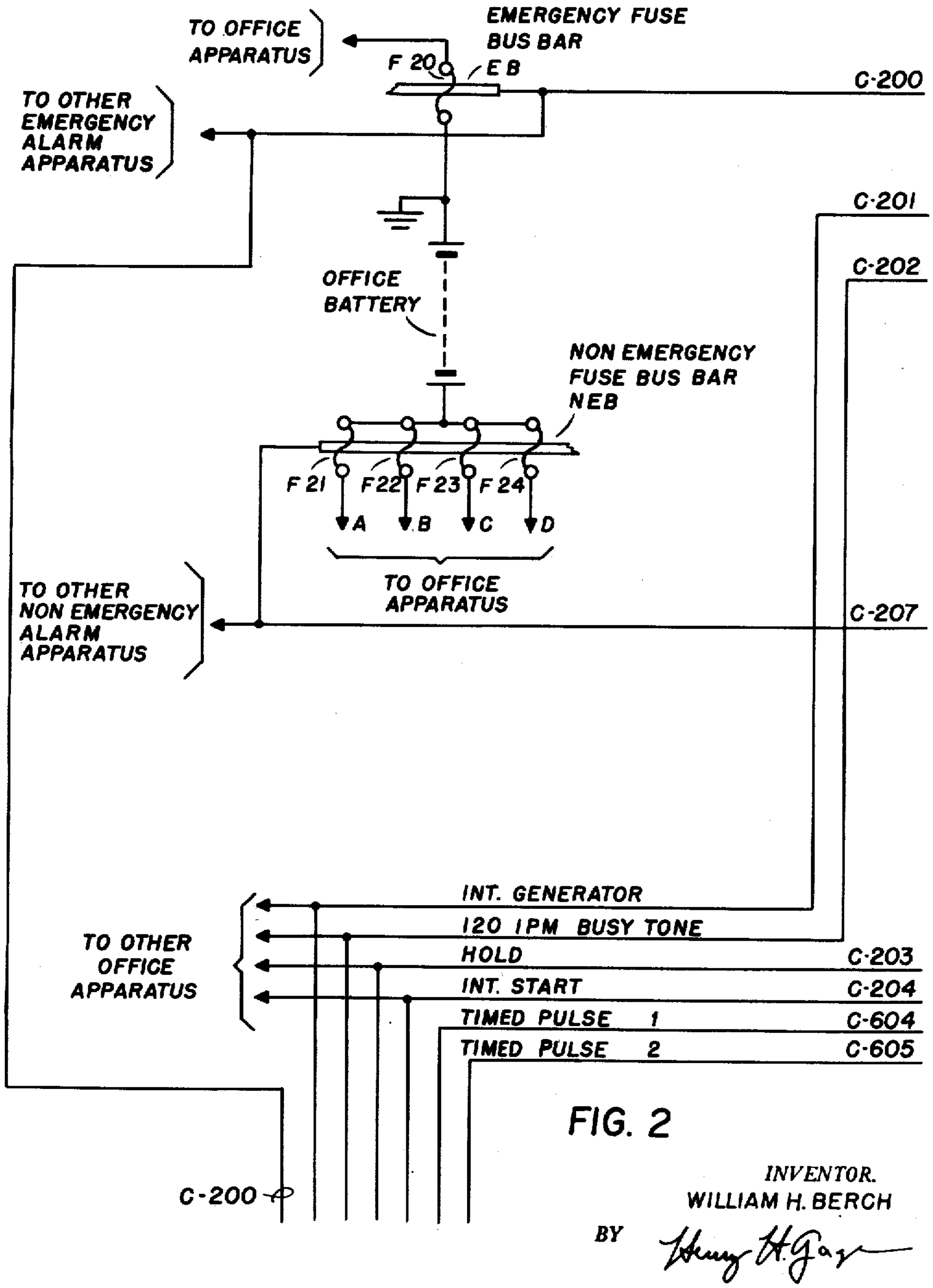
Figs. 2 and 4–8 show the alarm apparatus which is suitable for use in either the satellite or tandem offices.
Figure 3:
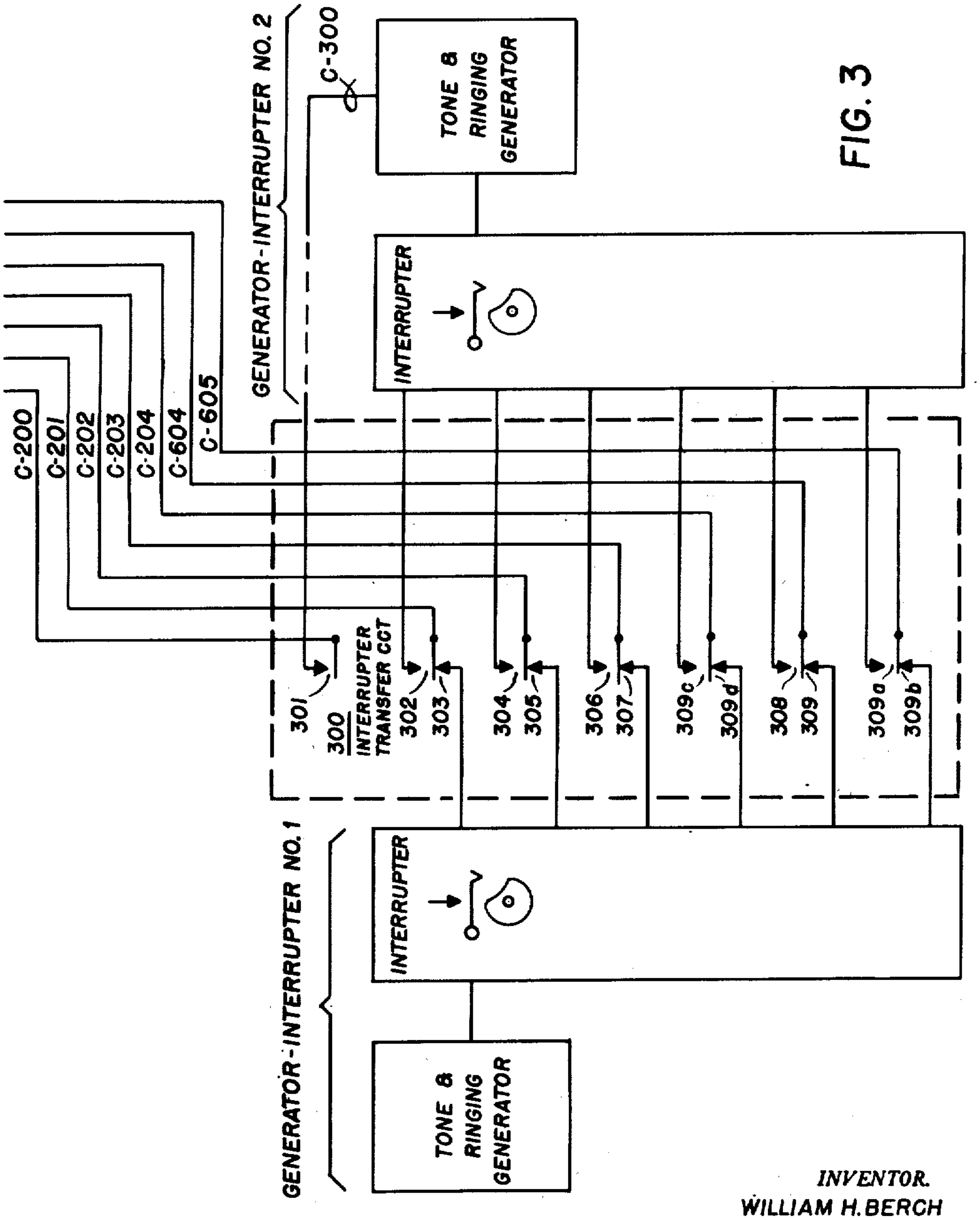
Fig. 3 shows a skeletonized representation of a part of the common apparatus of the satellite office.
Figure 4:
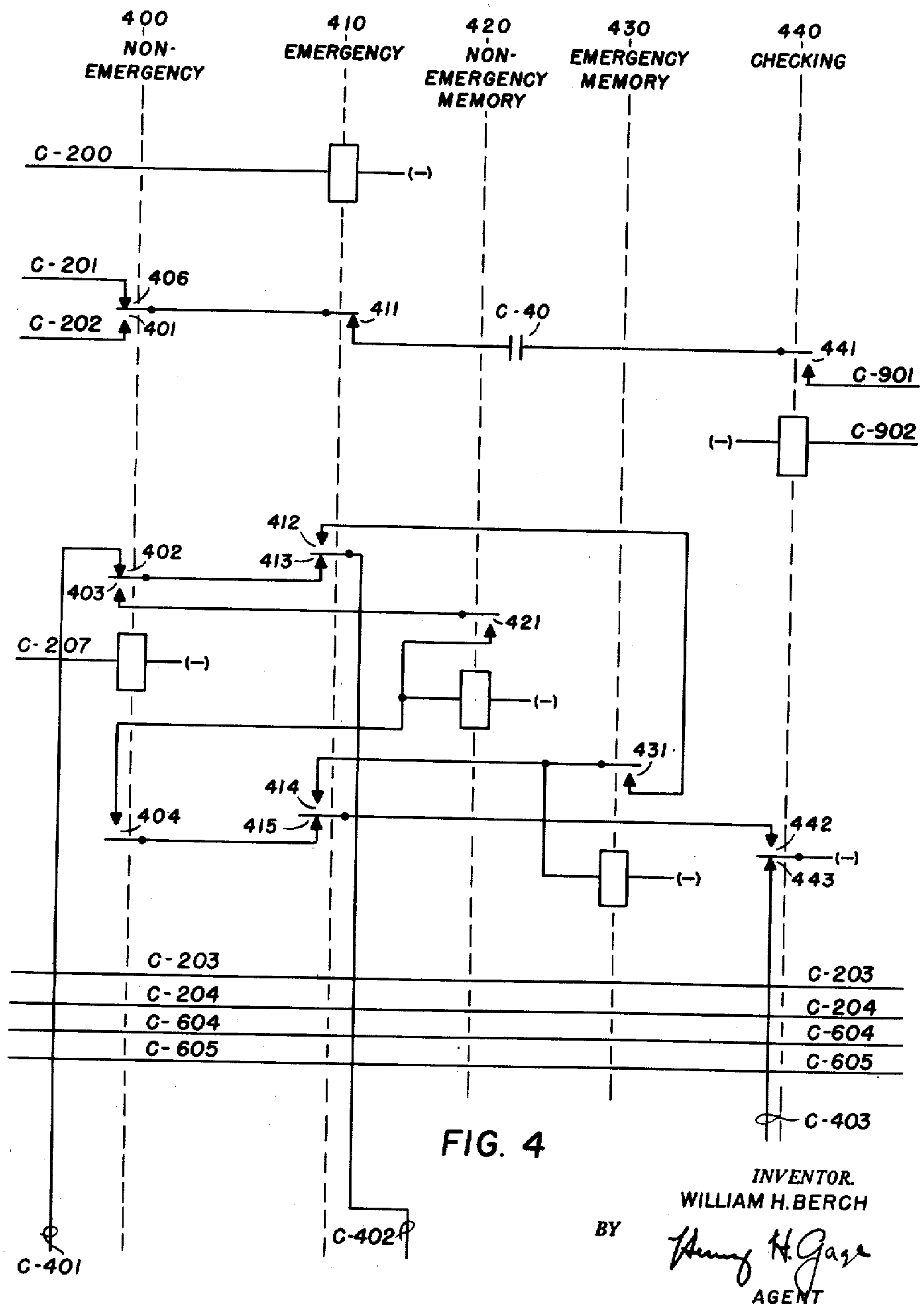
Figure 5:
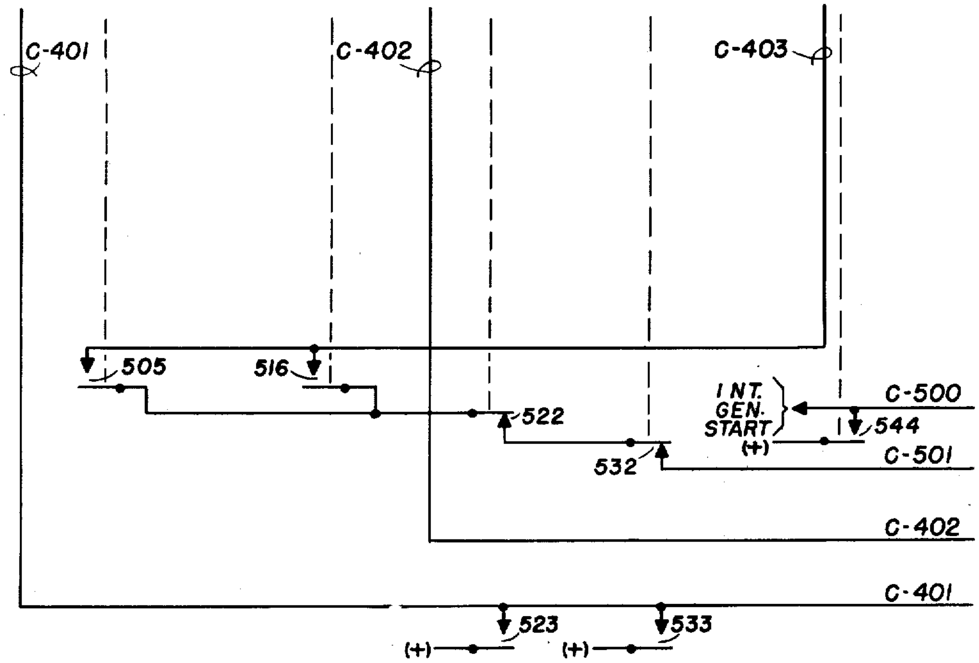
Figure 12:
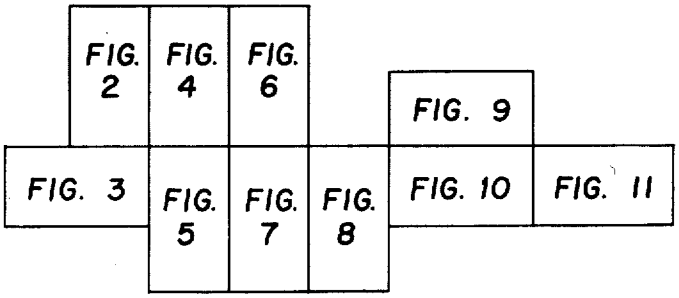
Fig. 12 shows the manner in which the other figures are related.
Figure 6:
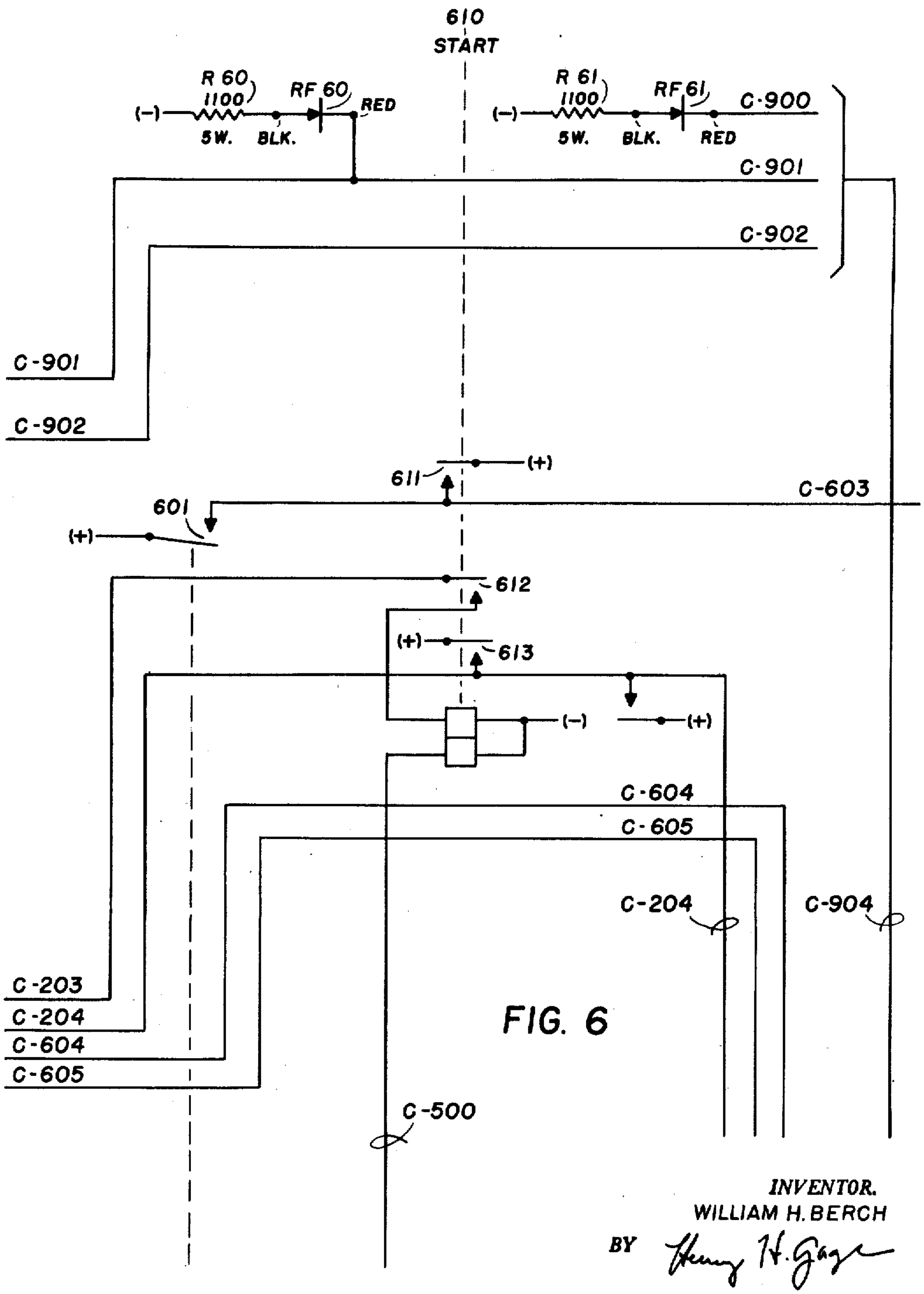
Figure 7:
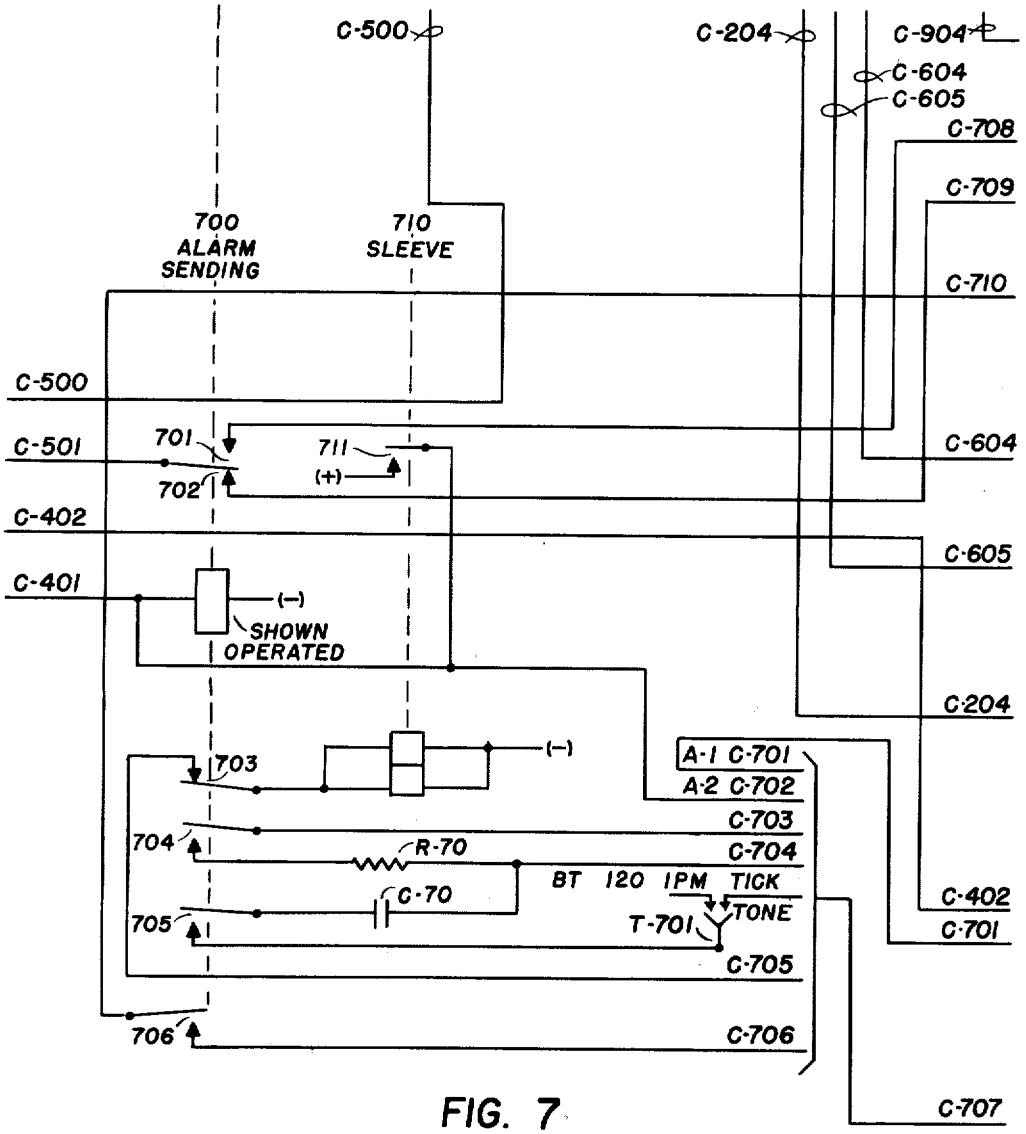
Figure 8:
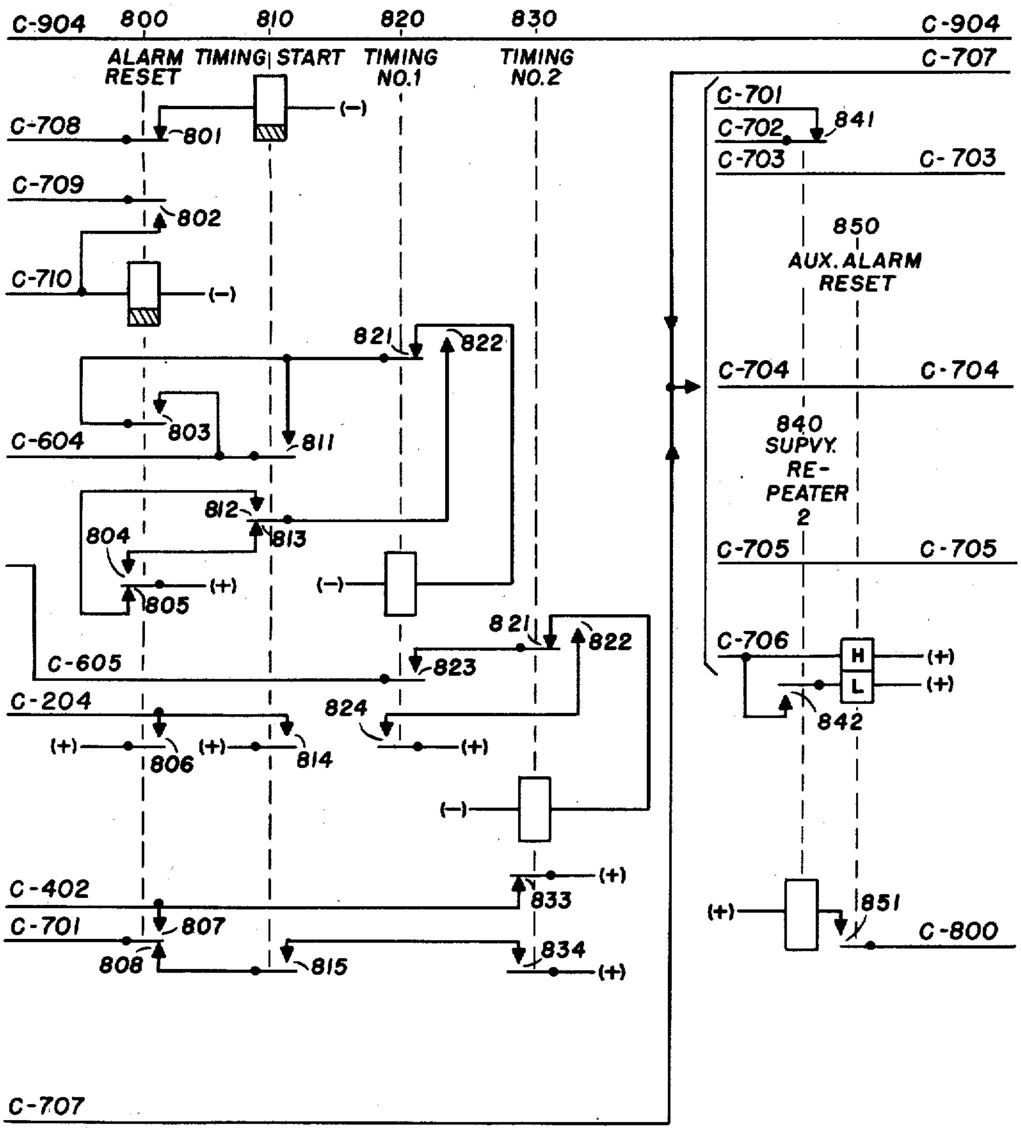
Figure 9:
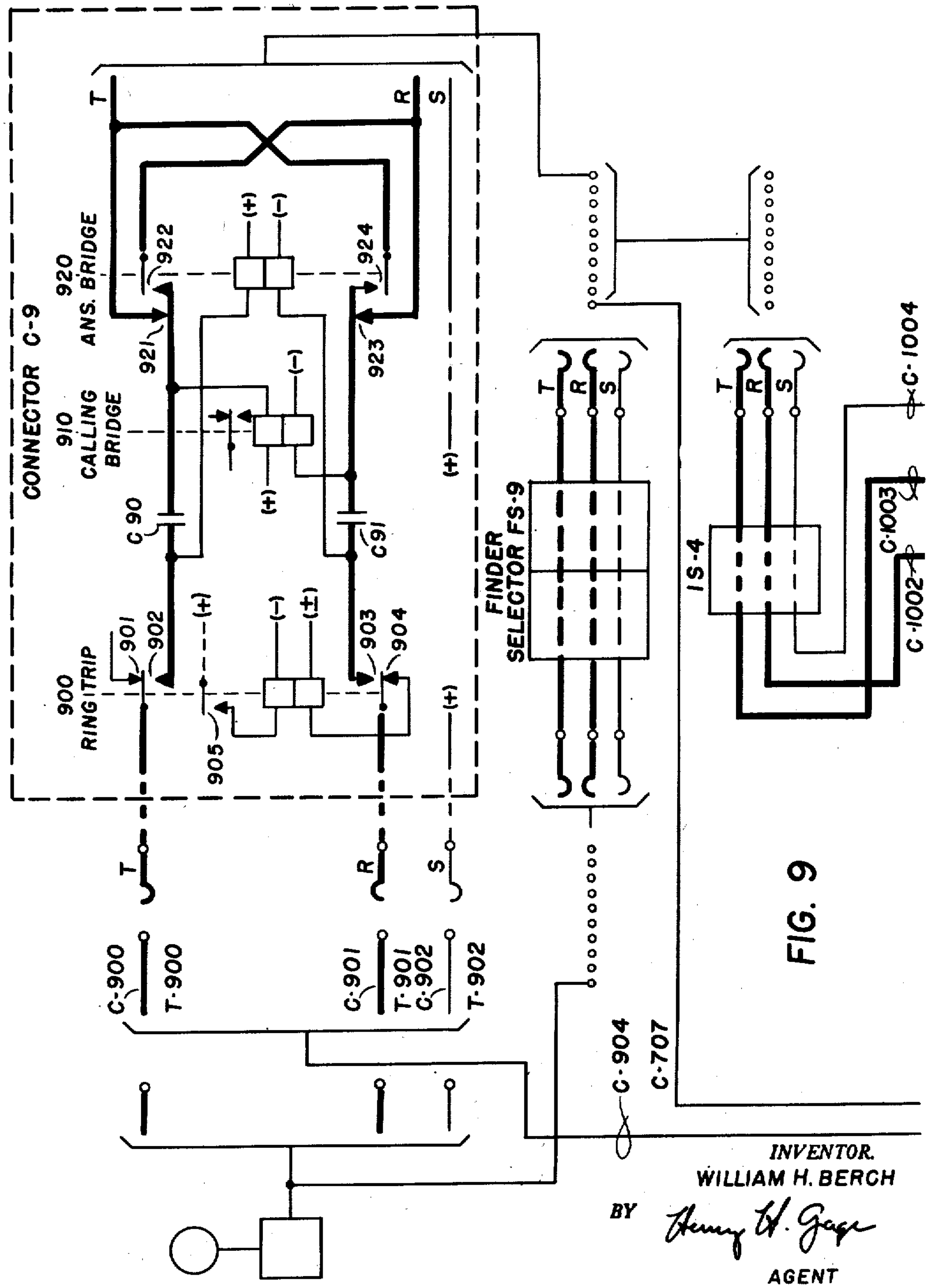
Fig. 9 shows the skeletonized representation of the switching means in the satellite office.
Figure 10:
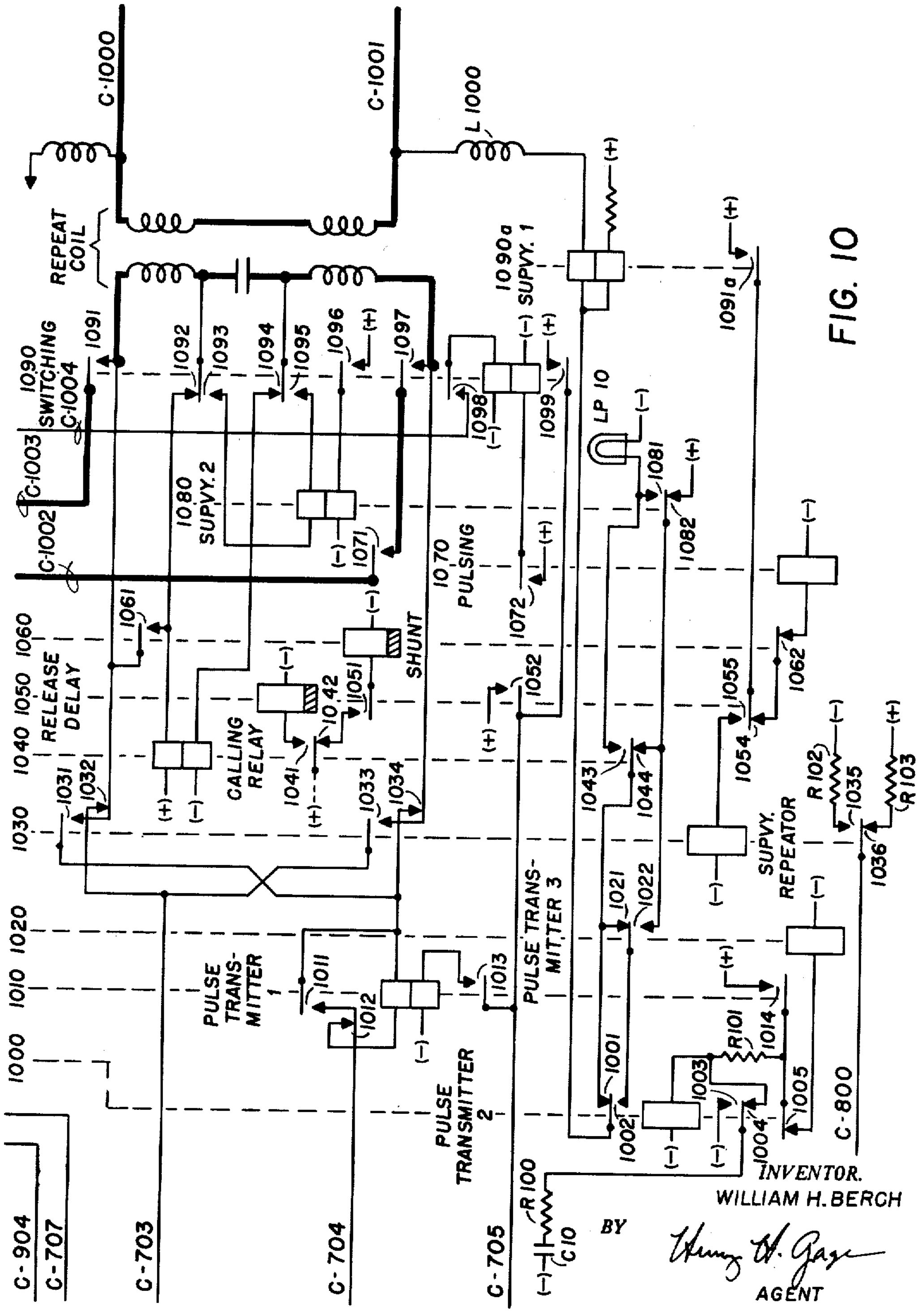
Fig. 10 shows the satellite office termination of the trunk interconnecting the satellite and tandem offices.
Figure 11:
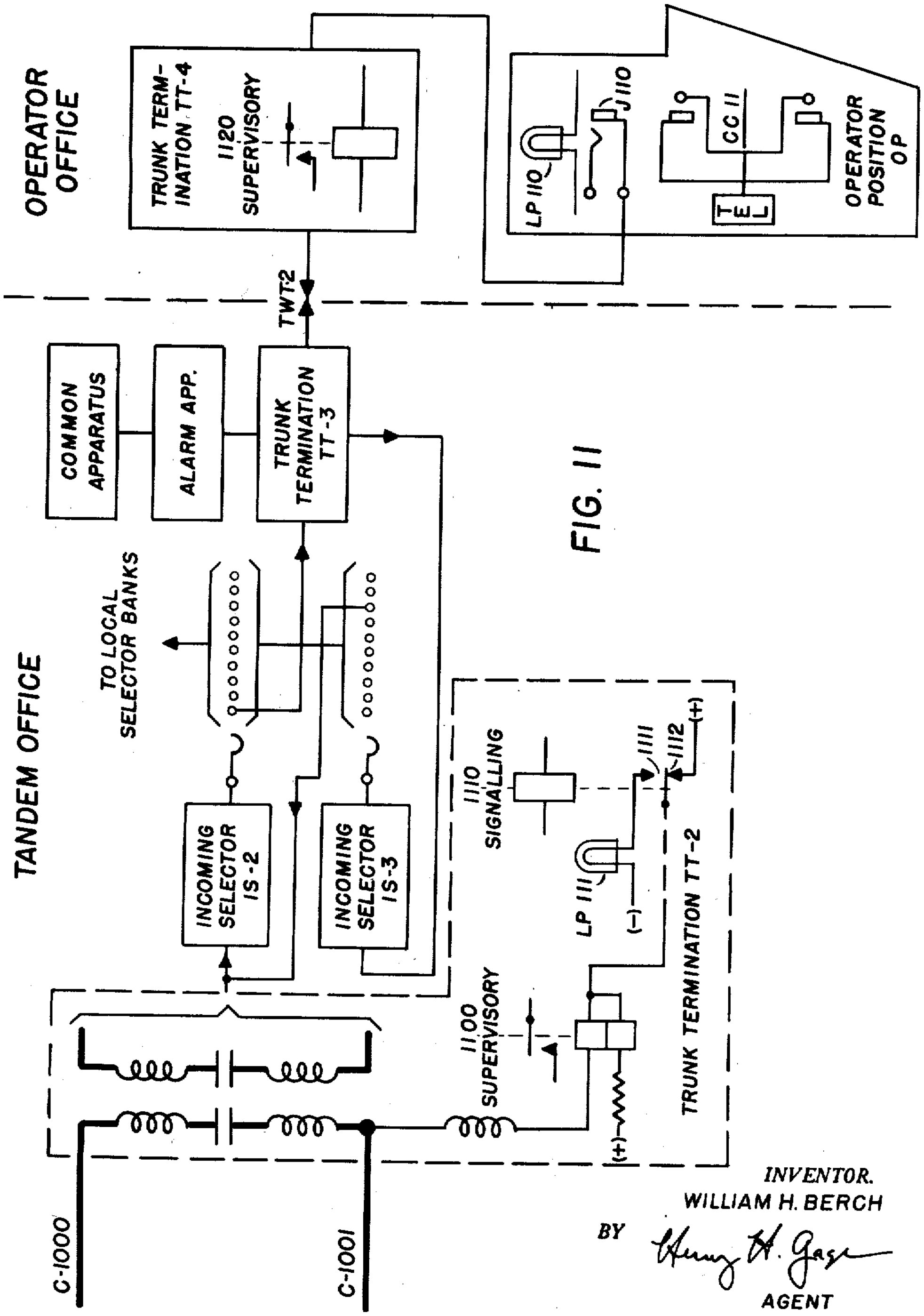
Fig. 11 shows in skeletonized form apparatus found in the tandem office and at the operator position.

In the preferred embodiment of my invention, the equipment in each of the satellite and tandem offices and the operator position operates from energy supplied from a local current source such as a battery, the most negative ungrounded plate of which is hereafter referred to as "battery" and symbolically as (−), and the most positive grounded plate of which is hereafter referred to as "ground" and symbolically in the drawings as (+).

The apparatus in each of the offices may be arranged in any of a number of ways well known in the telephone art. The common apparatus may include first and second tone and ringing generators which supply continuous 20-cycle alternating current and continuous 400-cycle dial and busy tone suitable for signaling purposes; a first and a second combination timer interrupter; and an interrupter transfer circuit of the type referred to in the following description. Similarly, it is to be understood that the switching operations referred to in the detailed description which follows can be accomplished by any suitable switching apparatus, such as the well known step-by-step system, and that such a system will function satisfactorily when incorporated in the preferred embodiment of my invention. Because the details of the apparatus are well known in the telephone art and because they do not pertain particularly to the present invention, the detailed description which follows is confined to only those details of operation which are pertinent to the invention; the remaining non-pertinent details are referred to only in general terms.

In the detailed description which follows, reference is made to "major alarms" and "minor alarms"; these terms are next explained. In unattended offices, such as the satellite office shown in Fig. 1, the ability of the office to complete even a part of the calls placed therein depends upon the successful functioning of certain components. Failure of such a necessary component is called a "major alarm." An example of a major alarm is the failure of the tone and ringing generator supply, which is next described. In the preferred embodiment of my invention, duplicate generator interrupter sets #1 and #2 are each capable of supplying interrupt ringing current and timing pulses to the unattended office. Set #1 is kept in use and set #2 is retained on a stand-by basis until a fault condition arises in set #1 at which time detecting apparatus causes a transfer circuit to transfer the exchange from set #1 to set #2. The failure of set #2 while it is in use is considered to be a major alarm condition.

Other failures of a less significant nature which do not impair the functioning of the whole exchange are referred to as "minor alarms." An example of a minor alarm is the blowing of a fuse individual to one of the switching links within the unattended office.

Assume first that a major alarm condition has occurred in the satellite office, such as the failure of the 20-cycle ringing generator part of stand-by generator-interrupter set #2, after the interrupter transfer circuit 300 has operated to transfer the exchange from set #1. Such a failure is indicated by means within the generator, operative responsive to a fault condition which places a ground on conductor C300. Alarm indicating means comprising emergency relay 410 is thereupon operated from ground connected through contacts 301 of interrupter transfer circuit 300, conductor C200, the winding of relay 410 to battery. Relay 410 remains operated so long as the emergency condition continues to exist.

Operation of emergency relay 410 is effective for actuating means for seizing the satellite office termination TT–1 comprising alarm sending relay 700. It is pointed out that when conditions in the satellite office are normal, the alarm sender is deactuated by the operation of relay 700 which is held in its operated condition over a circuit which runs from ground through break contacts 833, 413 and 402. Therefore, operation of emergency relay 410 is effective to open the holding circuit of relay 700 at contact 413 to actuate the sender by releasing relay 700.

The seizure of trunk termination TT–1 in the satellite office is next described. When relay 700 releases, seizure responsive means comprising calling bridge relay 1040 is made effective to seize termination TT–1 as follows; a loop circuit is completed for operating the calling bridge relay 1040 over the following circuit: ground, the upper winding of relay 1040, break contact 1092, the upper left-hand winding of repeat coil RPT10, break contact 1032, conductors C703, now-closed contacts 704 of alarm sender relay 700, resistor R70, conductors C704, break contact 1012, the upper winding of pulse transmitter 1 relay 1010, break contact 1034, the lower left-hand winding of repeat coil RPT10, break contact 1094, the lower winding of calling bridge relay 1040 to battery. Relay 1040 thereupon operates and starts the seizing operation of termination TT–1; the remainder of the seizure operation is explained later in this description.

Release of relay 700 is also effective at contacts 601 to place ground on the generator-start lead C603 to start the ringing and tone generator then in service in the event that the generator has not already been started by other apparatus in the satellite office. Release of relay 700 is also effective to actuate the first timing means comprising timing start relay 810 over the following circuit: from ground through break contacts 843, make contacts 416 of now-operated emergency relay 410, break contacts 422 and 432, now-closed contacts 701 on the alarm sender relay, break contacts 801, the winding of timing start relay 810 to battery. Relay 810 thereupon operates with effects to be explained later in this description. An office identifying tone such as the 120 impulse per minute busy tone is connected to the trunk termination TT–1 by the release of relay 700 over the following circuit: from the 120 IPM BT source, terminal T701 through now-closed contacts 705 on relay 700, blocking capacitor C70, to conductor C704, thence to the upper left-hand winding of repeat coil RPT10, break contacts 1092, the upper winding of relay 1040, to battery.

Release of relay 700 is also effective to close an operating circuit for auxiliary alarm reset relay 850 as follows: from ground through the upper, high resistance winding of relay 850, conductor C706, now-closed contacts 706 on alarm sending relay 700, the winding of alarm reset relay 800 to battery. The resistance of the upper winding of alarm reset 1 relay 850 is sufficient to prevent enough current from flowing in the above traced circuit to operate relay 800, and at the same time allow the flow of current sufficient to operate relay 850. The effect of the operation of relay 850 is explained later in this description. Release of relay 700 is also effective to prevent the operation of sleeve relay 710 at this time by opening the operating circuit of the latter relay at contacts 703. The function of the sleeve relay is more fully explained later in this description.

Turning next to the completion of the seizure of trunk termination TT–1, operation of the seizure responsive calling bridge relay 1040 over the previously described loop circuit is effective to complete a circuit for operating release delay relay 1050 as follows: from ground, contacts 1041, the winding of release delay relay 1050 to battery. Operation of calling bridge relay 1040 is also effective to transfer the derived signaling path comprising the composite leg of trunk TWT–1 from its normal connection to ground to a connection to battery over the following circuit: from battery, through ballast lamp LP10, make contacts 1043 on calling bridge relay 1040, break contacts 1001, the upper winding of duplex supervisory relay 1090*a*, the derived signaling path comprising inductance coil L1000, conductor C1001 of trunk TWT, the upper winding of a duplex supervisory relay 1100 in trunk termination TT–2 in the tandem office, break contacts 1112 to ground; thereby operating relay 1100 and leaving supervisory relay 1090*a* in unoperated condition.

Operation of relay 1040 is also effective to cause the other seizure responsive means comprisign pulse transmitting relays 1, 2 and 3 (1010, 1000, and 1020, respectively) in trunk termination TT–1 to send forward switch directing signals to the incoming selector IS–2 which is associated with trunk TWT–1 at the tandem office in the manner next described. When the loop for operating the calling bridge relay 1040 has been completed by the release of alarm sending relay 700 in the above described manner, an operating circuit for pulse transmitter 1 relay 1010 is thereby completed through the upper winding of the latter relay as noted in the previously traced operating circuit of calling bridge relay 1040. Relay 1010 thereupon operates and locks up to ground from make contacts 1052 of release delay relay 1050, through make contacts 1013, the lower winding of pulse transmitter 1 relay 1010 to battery, and thereafter remains operated so long as release delay relay 1050 remains operated. Responsive to the operation of relay 1010, the operating winding of that relay is removed from the operating circuit of the calling bridge relay 1040 by opening of contacts 1012 and by completing an alternate circuit at make contacts 1011 to insure continuity of the operating loop for calling bridge relay 1040.

Operation of relay 1010 is effective to energize the winding of pulse transmitter 2 and 3 relays, 1000 and 1020, respectively, by closing ground to the windings of those relays at contacts 1014. Relay 1000, being a slow to operate type, does not operate until after relay 1010 has been operated. Relay 1020 operates from ground at make contacts 1014, break contacts 1005 on relay 1000, the winding of relay 1020 to battery. Closing of contacts 1014 also completes a charging circuit for capacitor C10 through resistors R101 and R100. Since the potential rise across the winding of relay 1000 is controlled by the flow of charging current into capacitor C10, the operation of relay 1000 from ground at contacts 1014, through resistor R11, the winding of relay 1000 to battery is delayed for a time approximately the charging time of capacitor C10. Operation of relay 1000 is effective to transfer the derived signaling conductor comprising C1001 of trunk TWT-1 from the previously described connection to battery through ballast lamp LP10 by way of break contacts 1001 to a connection to ground controlled by the transfer contacts 1021 and 1023 on relay 1020. Operation of relay 1000 is also effective to open the operating circuit of relay 1020 at contacts 1005. Relay 1020 therefore is released after the operation of relay 1000. During the time that relays 1000 and 1020 are operated, the derived signal path previously described is connected to ground over the following circuit: from conductor C1001, through inductance L1000, the upper winding of supervisory 1 relay 109*a*, make contacts 1002 on relay 1000, the now-made contacts 1022 on relay 1020, break contacts 1082 to ground. After relay 1020 has released, the above described derived signaling conductor is returned to its connection to battery at contacts 1021 by way of contacts 1043 and ballast lamp LP10. Relay 1000 remains operated and relay 1020 remains released for the duration of the call (i. e., while relay 1010 is held operated from ground supplied from contacts 1052 of release delay relay 1050). Thus it is seen that the seizure responsive means in trunk termination TT-1 is effective to automatically send forward a single pulse over the derived signaling conductor of trunk TWT-1 immediately after the seizure of trunk termination TT-1.

Connection of the derived signaling path to battery at termination TT-1 followed by the transmission of the pulse is effective to cause supervisory relay 1100 in the termination TT-2 at the tandem office to operate to seize selector IS-2 associated with termination TT-2 and thereafter to repeat a corresponding impulse to selector IS-2. Seizure of and transmission of such an impulse to selector IS-2 is effective to cause well known means to advance the switch in its primary direction to the first level; following the advance of the switch in its primary direction, the switch initiates a hunting operation to select an idle set of terminals in that level. Terminations such as TT-3 which are associated with trunks to the operator position OP such as trunk TWT-2 appear in the first level over which the incoming selector IS-2 is now hunting. An idle termination is indicated to the tandem office switch IS-2 by an idle set of terminals. When an idle termination such as TT-3 has been located, that termination and the trunk with which it is associated are seized. Responsive to seizure, termination TT-3 sends forward an incoming signal to the corresponding trunk termination TT-4 at the operator position OP by any of a number of methods which are well known in the telephone art. Transmission of an incoming signal is effective to cause trunk termination TT-4 to signal the attendant at the operator position OP by energizing an incoming lamp LP110.

Returning to the alarm sending apparatus in the satellite office, provision is made for the case where termination TT-1 and two-way trunk TWT-1 are in use for the extension of an inward or outward call to or from the satellite office at the time that relay 410 operates. During the extension of a call to or from the satellite office, busy indicating ground is placed on conductor C705 by the operation of contacts 1052 of relay 1050 (in the case of outgoing calls) or by the operation of contacts 1099 on switching relay 1090 (in the case of inward calls). Presence of the ground on conductors C705 causes the operation of sleeve relay 710 by extending through the still closed contacts C703 on alarm sending relay 700 the ground to the winding of relay 710 and battery. Operation of relay 710 is effective to maintain alarm sending relay 700 operated from ground supplied through contacts 711 of the sleeve relay over an obvious circuit to the winding of relay 700. Thus relay 700 is maintained operated even in the face of an alarm signal indicated by the operation of relay 410, in the manner previously described. When the termination TT-1 is released at the conclusion of such an inward or outward call to or from the satellite office, relay 1050 or 1090 releases to remove the busy indicating ground from conductor C705; sleeve relay 710 thereupon releases. Release of relay 710 is effective to allow the release of the alarm sending relay 700 in the previously described manner under the control of emergency relay 410.

Returning to the operation of timer start relay 810 in the satellite office which has been operated responsive to the release of alarm sending relay 700, operation of timing start relay 810 is effective to start the interrupter of generator-interrupter #2 currently in use by supplying ground to the interrupter-start lead over the following circuit: from ground, through contacts 814, interrupter-start conductor C204, contact 308, to the interrupter circuit. The interrupter circuit of generator-interrupter #2 thereupon operates to supply timed pulses and other interrupted signals to the common and alarm apparatus in the satellite office. The interrupter is effective to put out at periodic intervals, for instance, every two minutes, pulses of ground over the timed pulse 1 conductor C604, and a few seconds short of a like interval similarly spaced-apart ground pulses over the timed pulse 2 conductor C605.

Timing start relay 810 is effective for controlling a cyclically operated timing means comprising relays 820 and 830 in the manner next explained. Operation of relay 810 is effective to extend a connection from the timed pulse 1 conductor C604 to the winding of timing 1 relay 820, through break contacts 821 and make contacts 811, thereby operating relay 820 as soon as the timer applies ground pulse to conductor C604. Operation of relay 820 is effective to complete for itself a locking circuit from ground through break contacts 805, now-made contacts 812 on relay 810, and contacts 822 on relay 820, the winding of relay 820 to battery. Relay 820 is thereafter held operated so long as the call is unanswered at the operator position OP as indicated by the fact that alarm reset relay 800 remains in its unoperated condition.

Operation of timing 1 relay 820 is effective to bring about the operation of timing 2 relay 830 when the interrupter puts the next succeeding ground pulse on time pulse 2 conductor C605 by establishing the following circuit: from the interrupter in use, through transfer contacts 309*a* or 309*b* depending upon which interrupter is in use at the moment, time pulse 2 conductor C605, make contacts 823, break contacts 831 on timing 2 relay 830, the winding of relay 830 to battery. Operation of timing 2 relay is effective to open and close the operating and locking circuits, respectively, of relay 830 at contacts 831 and 832, respectively. The locking circuit is completed from ground at contacts 824 on timing 1 relay 820.

Operation of timing 2 relay marks the end of the first predetermined (2 to 4 minute) interval during which the alarm sending relay 700 is to be effective in the previously described manner to signal the operator position; at the end of the first predetermined interval, the first timing means including relays 820 and 830 is effective to release trunk termination TT-1 by making the alarm sending means in the satellite office comprising alarm sending relay 700 inoperative (i. e., relay 700 is restored to its normally operated condition). To this end the following circuit for operating relay 700 is completed: ground through contacts 834, 815, 808, conductor C701, contacts 841, conductor C702, to the winding of alarm sending relay 700 to battery. Operation of alarm sending relay 700 is effective to render the first timing means inoperative by opening the operating circuit of timing start relay 810 at contacts 701. Relay 810 releases and thereby releases relay 820 by opening the holding circuits of relay 820 at contacts 812. Release of relay 810 causes relay 830 to release by opening the locking circuit of relay 830 at contacts 824.

The alarm indicating connection to position OP is destroyed by the release of termination TT-1 and trunk TWT-1 in the following manner. The above described release of the termination seizure controlling means comprising relay 700 is effective for opening the previously traced circuit for operating the seizure responsive means comprising calling bridge relay 1040 in the trunk termination TT-1 at contacts 704; whereby relay 1040 is released. Release of relay 1040 is effective to release relay 1050 by opening contacts 1041. Release of relay 1050 is effective to release pulse transmitter relays 1000 and 1010 by opening the ground supplied to the latter relays at contacts 1052. Release of relays 1040, 1000 and 1010 is effective to transfer the previously traced derived signaling path of trunk TWT-1 from its connection to battery to its normal connection to ground which is supplied from contacts 1082, 1044 and 1001. Return of the derived signaling path to ground causes relay 1100 in trunk termination TT-2 at the tandem office to release. Release of relay 1100 causes incoming selector IS-2 to be released, thereby opening the connection which may have been extended from the satellite office to the operator position OP over trunks TWT-1 and TWT-2.

It is pointed out that the first timing means just described is effective when no supervisory signal is returned from the tandem office over trunk TWT-1 to the termination TT-1 in the satellite office. Thus, if for any reason, such as the failure of selector IS-2 to select an idle trunk, such as TWT-2, between the tandem office and the operator position, or the failure of an incoming signal lamp, such as LP110 at position OP, the operator fails to answer the incoming signal from the tandem office within the first predetermined time interval measured from the time that the alarm sender in the satellite office is actuated, the attempt to establish an alarm indicating connection is momentarily discontinued.

Returning to the consideration of the alarm sending apparatus, after the first timing equipment described above has caused the alarm sending apparatus in the satellite office to release termination TT-1, release of timing 2 relay 830 is effective to cause the apparatus to make another attempt to establish an alarm indicating connection by reoperating the seizure controlling means comprising relay 700 by causing the latter to release responsive to the release of the first timing means comprising relay 830 by opening the operating circuit of relay 700 at contacts 834. Release of relay 700 is effective in the previously described manner to seize termination TT-1 to cause incoming selector IS-2 at the tandem office to again attempt to establish a connection between the satellite office and the operator position OP. The first timing means continues to function in the above described manner until the trouble condition is cleared (to release relay 210) and relay 700 is reoperated from its normal holding circuit, thereby releasing relay 840; or until an alarm indicating connection has been extended successfully to the operator position OP and answered by the operator. The latter function is next described.

After an alarm indicating connection has been extended to position OP and an incoming signal lamp has been energized, the operator answers by actuating the call answering and originating means comprising cord circuit CC11. By inserting one of the plugs associated with cord circuit CC11 into jack J10 of the two-way trunk termination TT-4, supervisory means, such as relay 1120, is caused to transmit a supervisory signal to the trunk termination TT-3. At termination TT-3 the signal is repeated to the trunk termination TT-2 in any of a number of well known ways. The supervisory signal received at termination TT-2 operates signaling relay 1110. Operation of relay 1110 signals the satellite office termination TT-1 by transferring the tandem office end of the previously described derived signaling path comprising conductor C1001 from its normal connection to ground at the tandem office to a connection to battery through ballast lamp LP111 and by way of make contacts 1111. Transmission of such a supervisory signal is effective to bring about the operation of supervisory responsive means in termination TT-1 comprising relay 1090*a*. Operation of relay 1090*a* is effective to operate supervisory repeater 1 relay 1030 from ground supplied through the windings of the latter relay from make contacts 1091*a* and 1053. Operation of supervisory repeater 1 relay 1030 is effective to operate supervisory repeater 2 relay 840 from battery through resistor R102, make contacts 1035 on relay 1030, make contacts 851 on alarm reset relay 850, the winding of relay 840 to ground.

Operation of supervisory responsive means including relay 840 is effective to render the above described first timing means ineffective in the manner next described. Operation of relay 840 is effective to operate alarm reset relay 800 by connecting the lower, low resistance winding of relay 850 in parallel with the upper, high resistance winding of relay 850, thereby allowing sufficient current to flow in conductor C706 to bring about the operation of alarm reset relay 800.

Operation of alarm reset relay 800 is effective to release the first timing means comprising timing start relay 810 by opening contacts 805. Release of relay 810 prevents the operation of timing 1 relay 820 by opening contacts 811; in the event that relay 820 has already been operated at the time that contacts 811 are opened, relay 810 is released by the opening of the previously described holding circuit at contacts 805. Release of relay 820 is thereupon effective to disconnect relay 830 from the time pulse 2 lead C605 so that relay 830 may not be operated; by preventing the operation of relay 830 the previously described release of the alarm sending means comprising relay 700 cannot be carried out under the control of the first timing means.

In addition to its above described function of deactuating the first timing means, the alarm resetting means comprising alarm reset relay 800 controls a second cyclically operated timing means which is capable of reactuating the alarm sending means at the satellite office at the end of a second predetermined time interval following the receipt of an answering supervisory signal transmitted from the operator position. While the second timing means shown in the preferred embodiment of the present invention utilizes the same relays (820 and 830) used as the above described first timing means, it is understood that completely separate relays could be provided to carry out the second timing operation by one skilled in the art. The operation of the second timing means is next described.

When the operator at position OP has answered the alarm call extended from the satellite office to the operator position, she then connects the receiver of her telephone set TEL to listen for an office identifying tone. The office in which the fault condition has occurred is determined by the office identifying tone, such as the one which is connected to termination TT–1 from terminal T107 and to the alarm indicating connection. The operator then deactuates call answering and originating means by removing the plug of cord circuit C11 from jack J110 in the operator position OP. Removal of the plug from jack J111 is effective to cause the previously described supervisory means in the operator position and at the tandem office comprising relays 1120, 1110 and 1100 to stop the transmission of the previously referred-to supervisory signal to termination TT–1 in the satellite office.

Responsive to the removal of the answering signal, the supervisory responsive means comprising relay 1090*a* in termination TT–1 is released. Release of relay 1090*a* releases supervisory repeater 1 relay 1030 by opening contacts 1091*a*. Release of relay 1030 in turn releases supervisory repeater 2 relay 840 by opening contacts 1035. Responsive to the release of supervisory means comprising relay 840 and the operation of alarm reset means comprising relay 800, a circuit is completed for causing the termination seizure controlling means comprising relay 700 to be reoperated to release the built-up alarm indicating connection by releasing trunk termination TT–1 in manner previously described.

To complete the checking of the alarm signal, the operator immediately following the pull down operation of cord circuit CC11 reestablishes a connection from position OP to the satellite office where the alarm condition exists by inserting the plug of the cord circuit CC11 in the jack of an idle termination such as J110 to seize the associated trunk TWT–2 to the tandem office. After trunk TWT–2 has been seized, the operator causes apparatus (not shown) to advance a tandem office selector such as incoming selector IS–3 to be directed by any of a number of well known methods to the terminals of a trunk to the satellite office such as TWT–1. Seizure of trunk TWT–1 seizes the corresponding trunk termination TT–1 at the satellite office. The operator then causes the switching means comprising incoming selector IS–1 and connector C9 at the satellite office to extend the connection from the operator position to the alarm checking terminals T900, T901 and T902.

After advancing connector C9 so that the wipers T, R and S are in contact with the alarm checking terminals T900 through T902, respectively, the connector completes a cut-through operation by means not shown. Responsive to the operation of the cut-through means, ringing generator is supplied in the well known manner to conductors C900 and C901, through the lower winding of the ring trip relay 910, break contacts 904, wiper R, conductor C901, rectifier RF60, resistor R60, to battery. The action of rectifier RF60 is to bring about a rectification of ringing current flowing through the lower winding of relay 910. Such rectified ringing current is sufficient to operate the ring trip relay 910 which thereupon locks up in a manner well known in the telephone art from master ground in connector C9, through contacts 905, the upper winding of relay 910 to battery. Operation of relay 900 is effective to extend a speech transmission connection from conductors C900 and C901 to the speech transmission conductors of trunk TWT–1 and thence to the operator position OP.

In the case presently being discussed, the alarm condition is of the emergency type. Transmission of tone is prevented by the opening of contacts 411 on emergency relay 410; the operator is appraised of the emergency nature of the condition by the absence of tone transmitted over the above described speech transmission circuit. Responsive to the extension of a connection to the alarm checking terminals, wiper S of connector C9 to terminal T902 is effective to extend ground over conductors C902 to operate the other means comprising checking relay 440 over an obvious circuit.

Operation of checking relay 440 is effective to cause the second timing means to be ineffective by bringing about the following operation. Responsive to the operation of relay 440, the locking circuit of alarm reset relay 800 is opened at break contacts 443. Relay 800 thereupon releases; release of relay 800 is effective to render the second timing means; the latter result is caused by opening the operating and holding circuit of timing 1 relay 820 at contacts 803 and 804, respectively.

Operation of relay 440 is also effective for operating the emergency memory relay 430 which is effective for preventing the retransmission of an alarm signal to the operator position responsive to the extension of a connection from the operator position to the alarm checking terminals. The operating circuit of relay 430 is completed from ground, contacts 442 on checking relay 440, operated contacts 414, to the winding of emergency memory relay 430 to battery. Relay 430 thereupon locks up from ground extended through contacts 833, operated contacts 412 and 431 to the winding of relay 430 to battery. Responsive to the rendering of the second timing means ineffective, relay 430 is held operated until the trouble condition is cleared to release relay 410 because timing 2 relay 830 is prevented from operating and the locking ground from contacts 833 is assured.

In the event that the operator fails to dial the connection from position OP through to the alarm checking terminals in the satellite office within a second predetermined interval of time, operation of alarm resetting means comprising relay 800 is effective to make the second timing means comprising relays 820 and 830 effective by connecting timing 1 relay to the time pulse 1 conductor C604. Thereafter, relay 820 operates to connect timing 2 relay 830 to the time pulse 2 conductor C605 in the previously described manner. At the end of the second predetermined time interval of 2 to 4 minutes, the time pulse 2 relay is operated in the manner previously described in connection with the timing of the transmission of an alarm signal to the tandem office and locks up in a manner similar to the one previously described. It is to be noted that timing 1 relay 820 instead of locking to ground at break contact 805 is now locked through make contact 804, break contact 813, and make contact 822 to the winding and battery of relay 820.

The subsequent operation of timing 2 relay 830 brought about when ground is next applied to time pulse 2 conductor C605 is effective to release alarm sending relay 700 so that the apparatus including trunk termination TT–1 and incoming selector switch IS–2 at the tandem office function in the previously described manner to attempt to establish an alarm indicating connection between the satellite office and the operator position OP.

The foregoing description is confined to the so-called emergency alarm condition in the satellite office. A non-emergency type alarm condition is next described. When a non-emergency alarm condition arises in the satellite office, for instance, if a fuse individual to the links such as F21 blows, ground is placed on non-emergency conductor C207 to operate non-emergency relay 400 over an obvious circuit. Operation of relay 400 is effective to actuate the alarm sender comprising relay 700 by opening the winding of the latter relay at contacts 402 which are in series with the previously described normal holding circuit of relay 700. Relay 700 is released with the same effect as that described in the case of an emergency alarm; the alarm indicating circuit timing and the alarm checking circuit to and from, respectively, the operator position OP are established in a manner similar to the one described above.

When the operator has caused an alarm checking connection to be extended to terminals T900, T901 and T902, the ringing circuit of connector C9 is tripped in the previously described manner. The operator at position OP is then informed of the non-emergency nature of the trouble by the application of 120 impulses per minute busy tone to the speech channel between the connector C9 wipers and the position which is completed at contacts 401.

As in the case of the dialing of the alarm checking terminals when an emergency alarm condition exists, checking relay 440 is operated when the alarm checking terminals are dialed for a non-emergency condition. In response to the operation of checking relay 440 and non-emergency relay 400, non-emergency memory relay 420 is operated by the completion of an operating circuit from ground, contacts 442, 404, the winding of relay 420 to battery. Relay 420 thereafter locks from ground supplied through contacts 833, 413, 403 and 421 to the winding of relay 420; relay 420 is thereby maintained in operated condition until the non-emergency alarm condition is cleared and relay 400 is released.

Operation of relay 420 has the same function as that described in the case of emergency alarm memory relay 430; namely, (1) to maintain alarm sending relay 700 in operated condition by supplying operating ground to the winding of relay 700 at contacts 523, and (2) to open the holding circuit of the second timing means comprising relay 800 at contacts 522.

It is to be noted that by arranging the emergency and non-emergency memory relays 430 and 420, respectively, to hold the alarm sending means in its deactuated condition, further alarm conditions of the minor type may be indicated to the alarm apparatus without causing the alarm sending means to transmit an additional alarm signal to the operator position if such a minor alarm condition occurs after a major alarm condition has been registered and the emergency memory relay 430 has been operated. However, if the order of events is reversed (i. e., a minor alarm arises, the alarm checking connection is established and a major alarm condition arises, in the order named), the operation of the emergency relay 410 is effective to release the non-emergency memory relay 420 by opening the holding circuit of the latter relay at contacts 413. Release of relay 420 and operation of relay 410 is effective to open the previously described holding and normal operating circuits of alarm sending relay 700 at contacts 523 and 413, respectively. The resulting release of relay 700 is effective in the previously described manner to establish an alarm indicating connection to operator position OP.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a telephone system, an office, an operator position including supervisory means for transmitting a signal, means for extending a connection from said office to said supervisory means, actuating means for rendering said connection extending means operative, means thereafter operative responsive to the transmission of said signal over said connection for making said actuating means inoperative, and timing means for thereafter causing said actuating means to render said connection extending means operative.

2. The system set forth in claim 1 wherein said actuating means is operative responsive to a fault condition in said office.

3. The system set forth in claim 1 wherein said means operative responsive to the transmission of said signal over said connection is effective at the conclusion of the transmission of said signal.

4. The system set forth in claim 1 wherein said timing means is operative responsive to the operation of said signal responsive means.

5. The system set forth in claim 1 in which said office comprises alarm checking terminals, and having in addition means responsive to the establishment of a connection to said alarm checking terminals before the reoperation of said actuating means for rendering said timing means ineffective.

6. In a telephone system, an office, an operator position including supervisory means for transmitting a signal, means for extending a first connection from said office to said supervisory means, actuating means operative responsive to a fault condition in said office for rendering said first connection extending means operative, means operative responsive to the transmission of said signal over said first connection for making said actuating means inoperative at the conclusion of transmission of said signal, and timing means operative responsive to the operation of said signal responsive means for thereafter causing said actuating means to render said connection extending means operative.

7. The system set forth in claim 6 in which said office comprises alarm checking terminals, and having in addition means for establishing a second connection from said operator position to said alarm checking terminals, and means responsive to the establishment of said second connection to said alarm checking terminals before the reoperation of said rendering means for actuating said timing means ineffective.

8. In a telephone system, an office, an operator position including supervisory means for transmitting a signal, means for extending a connection from said office to said supervisory means, actuating means in said office effective for operating said connection extending means, timing means for thereafter causing said actuating means to release said first connection a first predetermined time interval following the operation of said actuating means, means operative responsive to the transmission of said signal over said first connection before the reoperation of said actuating means under the control of said timing means for rendering said timing means inoperative and for thereafter causing said actuating means to release said first connection, said timing means being operative for thereafter causing said actuating means to render said first connection extending means operative.

9. The system set forth in claim 8 wherein said actuating means is operative responsive to a fault condition in said office.

10. The system set forth in claim 8 wherein said signal responsive means is effective for causing said actuating means to release said first connection at the conclusion of the transmission of said signal.

11. The system set forth in claim 8 wherein said timing means is operative responsive to the operation of said seizure controlling means and is effective for thereafter causing said actuating means to periodically render said first connection extending means operative.

12. The system set forth in claim 8 wherein said timing means is operative responsive to the operation of said signal responsive means and is effective for thereafter causing said actuating means to periodically render said first connection extending means operative.

13. The system set forth in claim 8 wherein said office comprises alarm checking terminals and having in addition means responsive to the establishment of a connection to said alarm checking terminals before the reoperation of said actuating means under the control of said timing means for rendering said timing means ineffective.

14. In a telephone system, an office comprising alarm checking terminals, an operator position including supervisory means for transmitting a signal, means for extending a first connection from said office to said supervisory means, actuating means in said office operative responsive to a fault condition in said office for controlling said first connection extending means, timing means operative responsive to the operation of said actuating means for thereafter causing said actuating means to periodically render said actuating means operative to release and then reoperate said first connection extending means, means operative responsive to the transmission of said signal over said first connection before the reoperation of said actuating means under the control of said timing means for rendering said timing means inoperative and for thereafter causing said actuating means to release said first connection at the conclusion of the transmission of said signal, said timing means being operative responsive to the operation of said signal responsive means for thereafter causing said actuating means to periodically render said first connection extending means operative, and means responsive to the establishment of a second connection to said alarm checking terminals before the reoperation of said actuating means under the control of said timing means for rendering said timing means ineffective.

15. The system set forth in claim 14 wherein the connection established to said alarm checking terminals is completed from said operator position to said office.

References Cited in the file of this patent

UNITED STATES PATENTS

| | | |
|---|---|---|
| 2,278,172 | Dimond | Mar. 31, 1942 |
| 2,595,388 | Kessler | May 6, 1952 |
| 2,647,163 | Lomax | July 28, 1953 |

U. S. DEPARTMENT OF COMMERCE

PATENT OFFICE

CERTIFICATE OF CORRECTION

Patent No. 2,815,405 December 3, 1957

William H. Berch

It is hereby certified that error appears in the printed specification of the above numbered patent requiring correction and that the said Letters Patent should read as corrected below.

Column 4, line 62, for "comprisign" read --comprising--; column 5, line 38, for "109a" read --1090a--; column 12, line 24, for "rendering" read --actuating--; same line, for "actuating" read --rendering--.

Signed and sealed this 8th day of April 1958.

(SEAL)
Attest:

KARL H. AXLINE

Attesting Officer

ROBERT C. WATSON
Commissioner of Patents